United States Patent [19]

Boettner et al.

[11] Patent Number: 5,482,500
[45] Date of Patent: Jan. 9, 1996

[54] CLAM AND OYSTER OPENER

[76] Inventors: Kevin M. Boettner, Rte. 3, Box 80, Galveston Isle, Tex. 77554; Joseph J. McHugh, 11365 7th Street E., Isle of Palms, Treasure Isle, Fla. 33706

[21] Appl. No.: 356,631

[22] Filed: Dec. 15, 1994

[51] Int. Cl.$^6$ ............................................. A22C 29/04
[52] U.S. Cl. ................................. 452/16; 452/13
[58] Field of Search ............................ 452/16, 13

[56] References Cited

U.S. PATENT DOCUMENTS

| | | | |
|---|---|---|---|
| 189,966 | 4/1877 | Temple | 452/16 |
| 1,071,352 | 8/1913 | Schmidt | 452/16 |
| 2,747,220 | 5/1956 | Thomson | 452/16 |
| 4,348,788 | 9/1982 | Jurcak | 452/16 |
| 4,393,546 | 7/1983 | Ruiz | 452/16 |

FOREIGN PATENT DOCUMENTS 384044  12/1932  United Kingdom ................ 452/16

*Primary Examiner*—Willis Little

[57] ABSTRACT

An opener for separating the shells of a clam or oyster. The inventive device includes a base plate having a support channel for receiving and supporting an oyster. A lever arm is pivotally mounted to the base plate and includes an engaging tip secured to the lever arm and positioned for engagement with the oyster residing within the support channel to effect cracking and opening of the oyster. The opener substantially reduces a chance of an operator sustaining a laceration during opening of a shell, thereby reducing a risk of viral contamination of the associated clam or oyster.

8 Claims, 4 Drawing Sheets

CLAM AND OYSTER OPENER

BACKGROUND OF THE INVENTION

1. Field of the Invention

The present invention relates to shell separation devices and more particularly pertains to a clam and oyster opener for separating the shells of a clam or oyster.

2. Description of the Prior Art

The use of shell separation devices is known in the prior art. More specifically, shell separation devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art shell separation devices include U.S. Pat. No. 5,178,577; U.S. Pat. No. 4,870,719; U.S. Pat. No. 4,787,123; U.S. Pat. No. 3,886,628; and U.S. Pat. No. 3,683,458.

While these devices fulfill their respective, particular objectives and requirements, the aforementioned patents do not disclose a clam and oyster opener for separating the shells of a clam or oyster which includes a base plate having a support channel for receiving and supporting an oyster, and a lever arm pivotally mounted to the base plate and including an engaging tip secured to the lever arm and positioned for engagement with the oyster residing within the support channel to effect cracking and opening of the oyster.

In these respects, the clam and oyster opener according to the present invention substantially departs from the conventional concepts and designs of the prior art, and in so doing provides an apparatus primarily developed for the purpose of separating the shells of a clam or oyster.

SUMMARY OF THE INVENTION

In view of the foregoing disadvantages inherent in the known types of shell separation devices now present in the prior art, the present invention provides a new clam and oyster opener construction wherein the same can be utilized for opening the shell of a clam or oyster. As such, the general purpose of the present invention, which will be described subsequently in greater detail, is to provide a new clam and oyster opener apparatus and method which has many of the advantages of the shell separation devices mentioned heretofore and many novel features that result in a clam and oyster opener which is not anticipated, rendered obvious, suggested, or even implied by any of the prior art shell separation devices, either alone or in any combination thereof.

To attain this, the present invention generally comprises an opener for separating the shells of a clam or oyster. The inventive device includes a base plate having a support channel for receiving and supporting an oyster. A lever arm is pivotally mounted to the base plate and includes an engaging tip secured to the lever arm and positioned for engagement with the oyster residing within the support channel to effect cracking and opening of the oyster.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new clam and oyster opener apparatus and method which has many of the advantages of the shell separation devices mentioned heretofore and many novel features that result in a clam and oyster opener which is not anticipated, rendered obvious, suggested., or even implied by any of the prior art shell separation devices, either alone or in any combination thereof.

It is another object of the present invention to provide a new clam and oyster opener which may be easily and efficiently manufactured and marketed.

It is a further object of the present invention to provide a new clam and oyster opener which is of a durable and reliable construction.

An even further object of the present invention is to provide a new clam and oyster opener which is susceptible of a low cost of manufacture with regard to both materials and labor, and which accordingly is then susceptible of low prices of sale to the consuming public, thereby making such clam and oyster openers economically available to the buying public.

Still yet another object of the present invention is to provide a new clam and oyster opener which provides in the apparatuses and methods of the prior art some of the advantages thereof, while simultaneously overcoming some of the disadvantages normally associated therewith.

Still another object of the present invention is to provide a new clam and oyster opener for separating the shells of a clam or oyster.

Yet another object of the present invention is to provide a new clam and oyster opener which includes a base plate having a support channel for receiving and supporting an oyster, and a lever arm pivotally mounted to the base plate and including an engaging tip secured to the lever arm and positioned for engagement with the oyster residing within the support channel to effect cracking and opening of the oyster.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
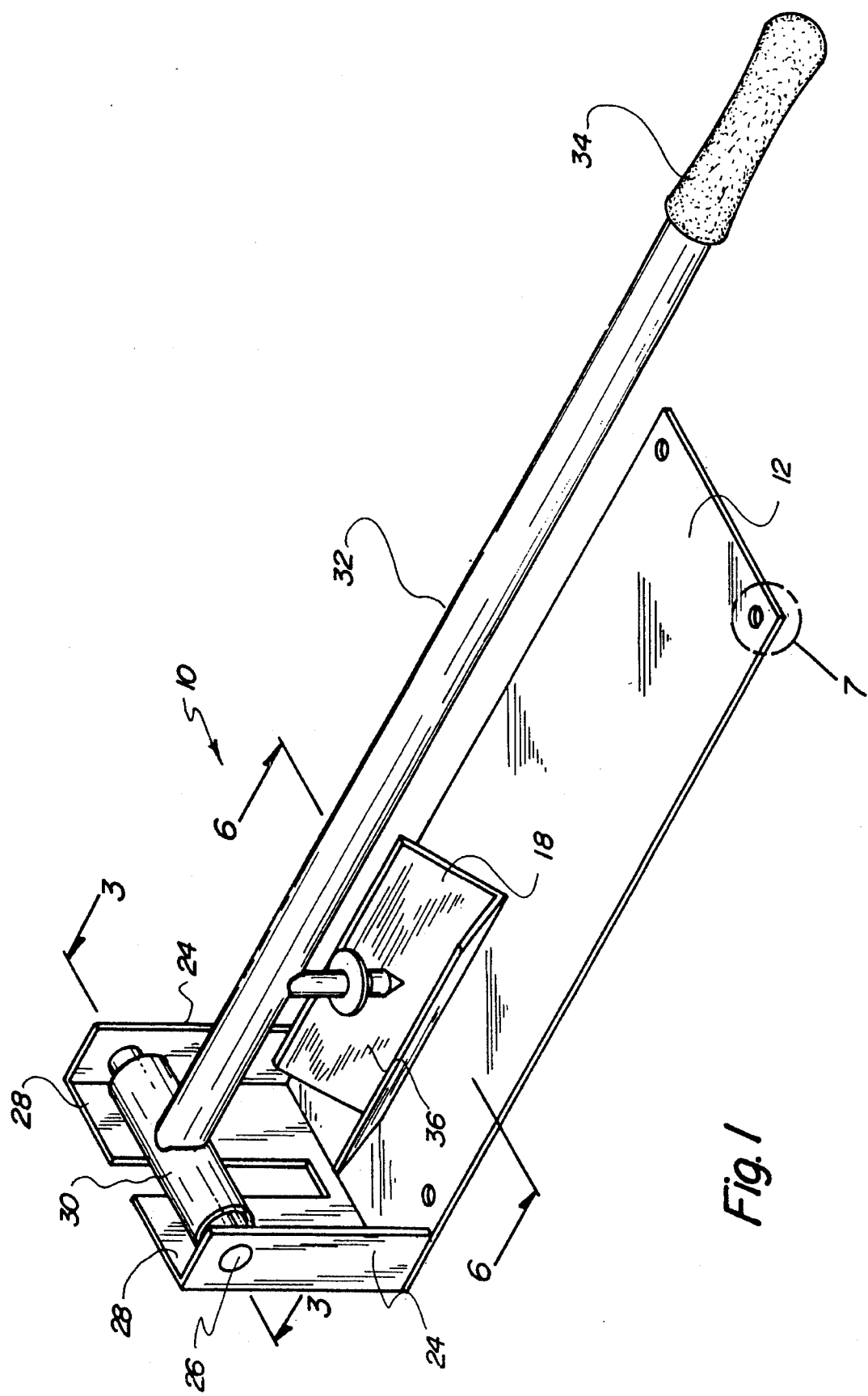
FIG. 1 is an isometric illustration of a clam and oyster opener according to the present invention.

With reference now to the drawings, and in particular to FIGS. 1–7 thereof, a new clam and oyster opener embodying the principles and concepts of the present invention and generally designated by the reference numeral 10 will be described.

Figure 7:
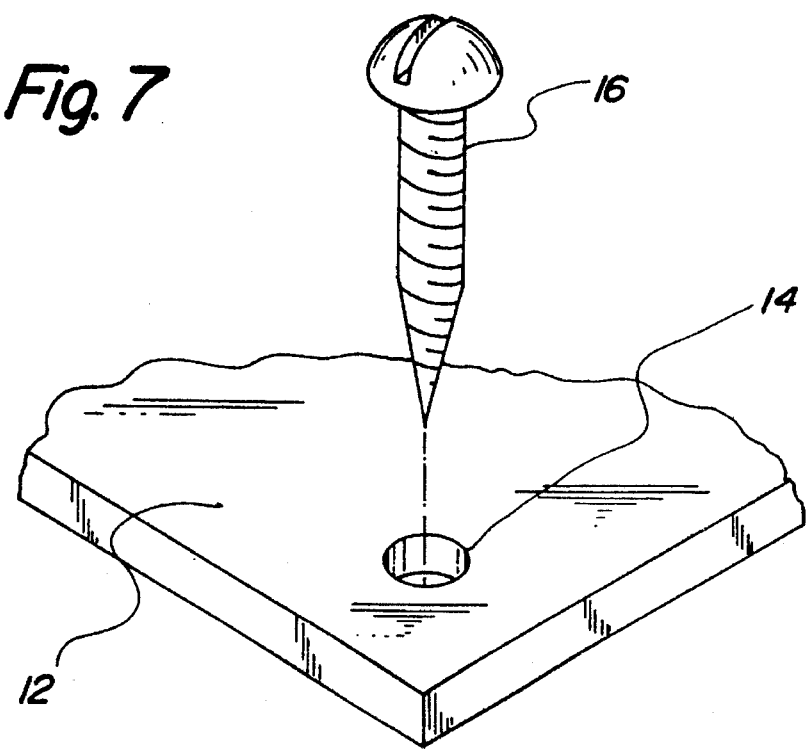
FIG. 7 is an enlarged isometric illustration of the area set forth in FIG. 1.

More specifically, it will be noted that the clam and oyster opener 10 comprises a base plate 12 positionable upon a support surface and preferably including at least one aperture 14 extending therethrough, as shown in FIG. 7, which permits the passage of a threaded fastener 16 through the base plate 12 to secure the base plate to an underlying support surface. A support channel 18 is secured to a top surface of the base plate 12 and is defined by a first planar member 20 (see FIG. 6) secured to an upper surface of the base plate 12 and oriented at an oblique angle relative thereto, with a second planar member 22 similarly secured to the upper surface of the base plate 12 and oriented at an oblique angle relative to both the base plate and the first planar member 20. The orientation of the first planar member 20 relative to the second planar member 22 defines the substantially V-shape of the support channel 18. By this structure, the clam or oyster can be positioned within the support channel 18 and oriented such that the opening crack of the oyster or clam is positioned within a substantially vertical plane extending through a juncture of the first and second planar members 20, 22.

Figure 2:
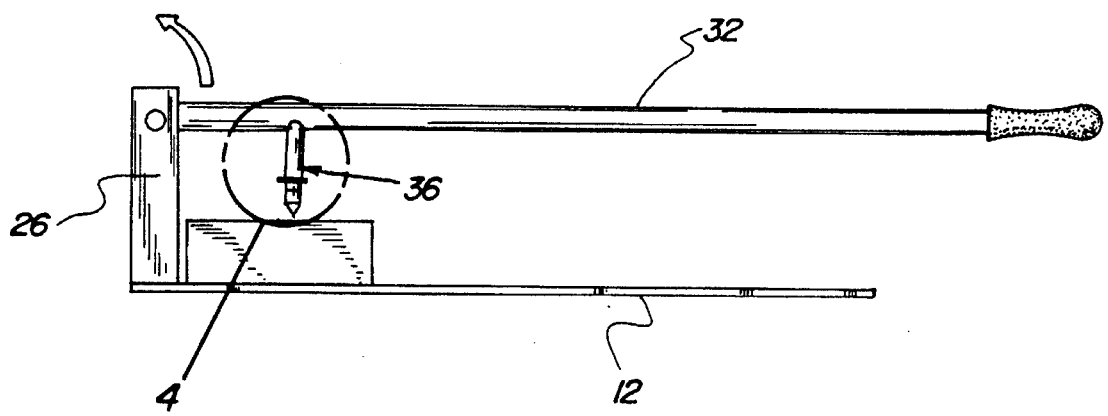
FIG. 2 is a side elevation view thereof.
Figure 3:
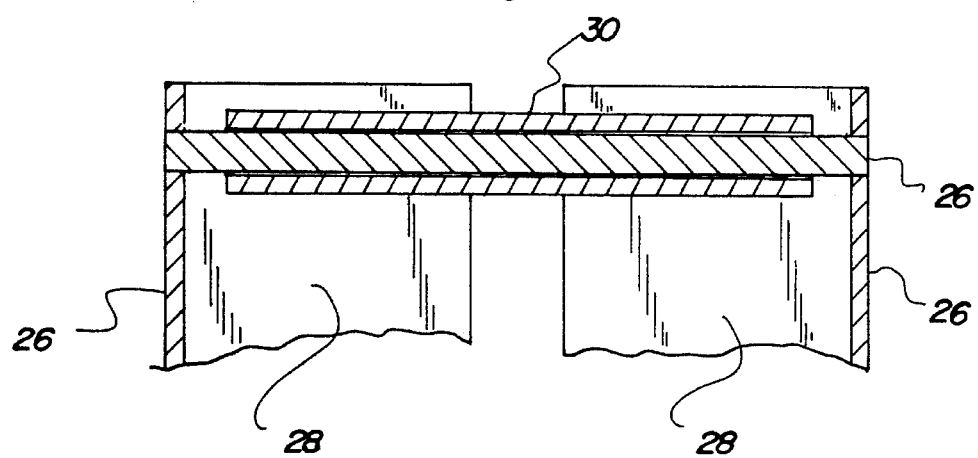
FIG. 3 is a cross-sectional view taken along line 3—3 of FIG. 1.

As best illustrated in FIGS. 1 through 3, the clam and oyster opener 10 further comprises a pair of spaced vertical stanchions 24 which extend upwardly from an end of the base plate 12 and cooperate to support an axle 26 therebetween. A pair of brace plates 28 are coupled to vertical edges of the vertical stanchions 24 and to the base plate 12 and cooperate to support the vertical stanchions 24 in a fixed position relative to the base plate. A rotatable tube 30 is concentrically disposed about the axle 26. A lever arm 32 having first and second ends is fixedly secured to the rotatable tube 30 at the first end of the lever arm, and is provided with a handle 34 at the second end thereof, whereby an individual can grasp and manipulate the handle 34 to effect pivotal movement of the lever arm 32 through the vertical plane extending through the support channel 18. Preferably, a length of the rotating tube is substantially less than a distance between the vertical stanchions, as shown in FIG. 1, such that the lever arm can be axially translated laterally as desired to center the lever arm over an oyster or clam. An engaging tip 36 is fixedly secured to the lever arm 32 and is positioned so as to extend into the support channel 18 to engage and open an oyster or clam positioned therewithin as described above.

Figure 4:
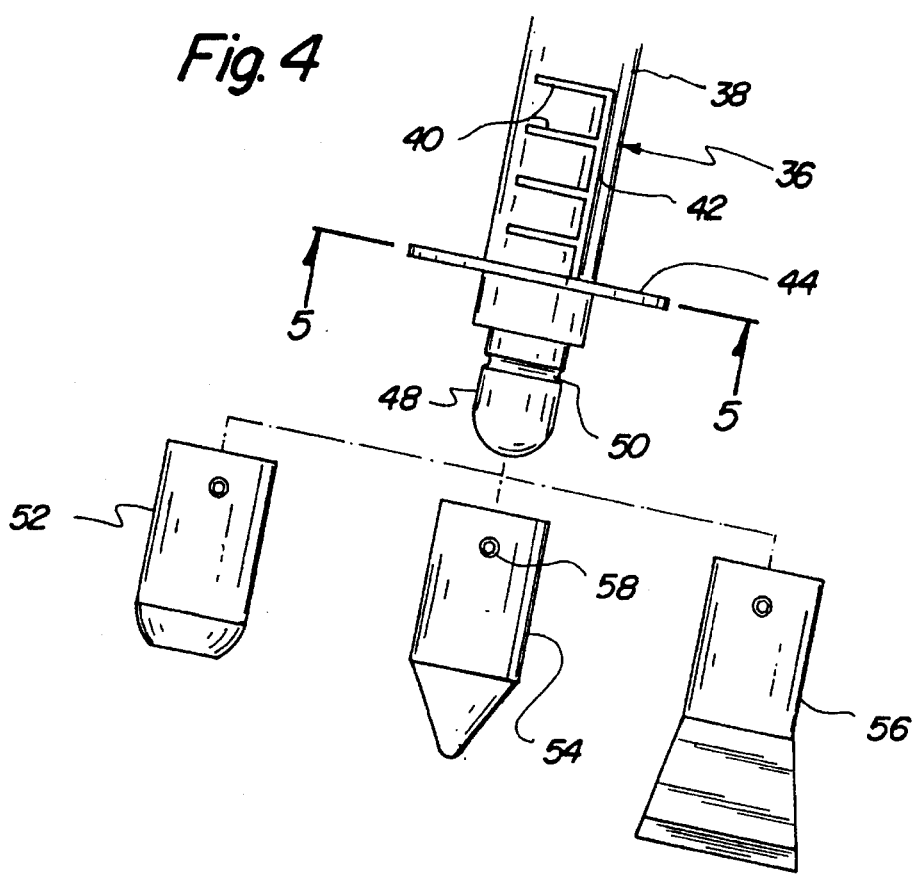
FIG. 4 is an enlarged view of the area set forth in FIG. 2.
Figure 5:
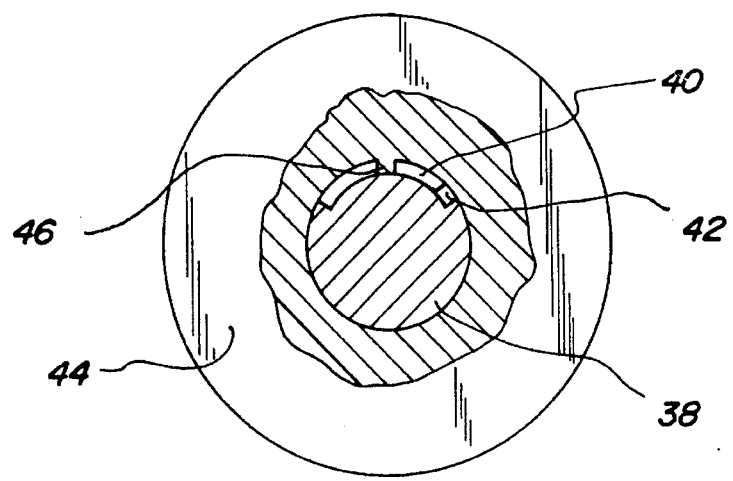
FIG. 5 is a cross-sectional view taken along line 5—5 of FIG. 4.
Figure 6:
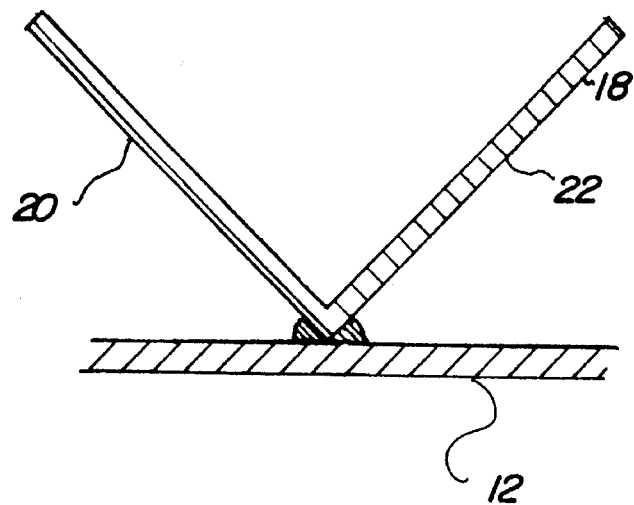
FIG. 6 is a further cross-sectional view taken along line 6—6 of FIG. 1.

As best illustrated in FIG. 4, it can be shown that the engaging tip 36 comprises a depending projection 38 which is fixedly secured to the lever arm 32 and includes a plurality of spaced transverse slots 40 extending partially therearound. A single longitudinal slot 42 extends into contiguous communication with the spaced transverse slots 40 and permits an adjustable plate 44 to be movably positioned into any one of the spaced transverse slots. As shown in FIG. 5, the adjustable plate 44 is concentrically disposed about the depending projection 38 and includes a radial projection 46 projecting radially inward and into one of the transverse slots 40. By this structure, the adjustable plate 44 can be rotated so as to position the radial projection 46 into the longitudinal slot 42, whereby axial movement of the adjustable plate 44 relative to the depending projection 38 can be accomplished to position the radial projection 46 into another one of the transverse slots 40. Such movement of the adjustable plate 44 allows the same to be positioned at a desired location along the depending projection 38 to limit a distance that the engaging tip 36 extends into the clam or oyster during cracking or opening thereof. The device operates appropriately when the adjustable plate is positioned approximately one and one-half inches from a lower most portion of the engaging tip to preclude damage to the oyster or clam being opened.

The engaging tip 36 continues past the adjustable plate 44 into a mounting projection 48 having an annular groove 50 extending circumferentially thereabout. The mounting projection 48 is operable to receive any one of a plurality of tips for mounting thereto. The tips, as shown in FIG. 4, include a blunt tip 52, a sharp tip 54, and a blade tip 56. The tips 52–56 each include a threaded set screw 58 directed therethrough which can be rotatably advanced into engagement with the annular groove 50 to effect securement of the respective tip to the mounting projection 48 of the engaging tip 36. By this structure, a desired tip 52–56 can be selectively coupled to the engaging tip 36 as desired.

In use, the clam and oyster opener 10 of the present invention operates to quickly and easily open the shell of the clam or oyster. An individual operating the device 10 can simply place the oyster within the support channel 18 with the lever arm 32 in a raised position, whereby a pivotal motion of the lever arm 32 towards the base plate 12 causes the engaging tip 36 to engage the oyster within the support channel 18 to effect cracking and opening of the oyster. The device 10 is particularly useful in an assembly line operation wherein a first individual hands the clams or oysters to a second individual operating the clam and oyster opener 10 to effect continuous opening of the clam and/or oysters.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A clam and oyster opener comprising:

a base plate positionable upon a support surface;

a support channel secured to a top surface of the base plate for receiving an object to be opened;

a lever arm pivotally mounted relative to the base plate, whereby an individual can grasp and manipulate the lever arm to effect pivotal movement of the lever arm through a vertical plane extending through a longitudinal axis of the support channel; and, an engaging tip secured to the lever arm and positioned so as to extend into the support channel to effect cracking of the object when placed within the support channel, the engaging tip comprising a depending projection fixedly secured to the lever arm, the depending projection including a plurality of spaced transverse slots extending partially therearound and a single longitudinal slot extending into contiguous communication with the spaced transverse slots; an adjustable plate concentrically disposed about the depending projection, the adjustable plate including a radial projection extending radially inward and into one of the transverse slots, whereby the adjustable plate can be rotated so as to position the radial projection into the longitudinal slot to permit an axial movement of the adjustable plate relative to the depending projection to position the radial projection into another one of the transverse slots, the adjustable plate being operable to limit a distance that the engaging tip extends into the object.

2. The clam and oyster opener of claim 1, wherein the engaging tip continues past the adjustable plate and terminates in a mounting projection having an annular groove extending circumferentially thereabout, the mounting projection being operable to receive and mount a tip.

3. The clam and oyster opener of claim 2, wherein the support channel comprises a first planar member secured to the top surface of the base plate and oriented at an oblique angle relative thereto; and a second planar member secured to the top surface of the base plate at a juncture of the first planar member and the base plate, the second planar member being oriented at an oblique angle relative to both the base plate and the first planar member.

4. The clam and oyster opener of claim 3, and further comprising a pair of vertical stanchions extending upwardly from an end of the base plate; an axle mounted between the vertical stanchions; a pair of brace plates coupled to vertical edges of the vertical stanchions and to the base plate to support the vertical stanchions in a fixed position relative to the base plate; a rotatable tube concentrically disposed about the axle, with the lever arm first end being coupled to the rotatable tube to pivotally mount the lever arm relative to the base plate.

5. The clam and oyster opener of claim 4, and further comprising a blunt tip secured to the mounting projection.

6. The clam and oyster opener of claim 4, and further comprising a sharp tip secured to the mounting projection.

7. The clam and oyster opener of claim 4, and further comprising a blade tip secured to the mounting projection.

8. A clam and oyster opener comprising:

a base plate positionable upon a support surface;

a support channel secured to a top surface of the base plate for receiving an object to be opened;

a lever arm pivotally mounted relative to the base plate, whereby an individual can grasp and manipulate the lever arm to effect pivotal movement of the lever arm through a vertical plane extending through a longitudinal axis of the support channel; and, an engaging tip secured to the lever arm and positioned so as to extend into the support channel to effect cracking of the object when placed within the support channel, the engaging tip comprising a depending projection fixedly secured to the lever arm; and an adjustable plate movably mounted to the depending projection, the adjustable plate being selectively securable in one of a plurality of predetermined axial locations along the depending projection, the adjustable plate being operable to limit a distance that the engaging tip extends into the object.

* * * * *